United States Patent
Tsai et al.

(10) Patent No.: US 7,687,415 B2
(45) Date of Patent: Mar. 30, 2010

(54) ELASTIC NONWOVEN COMPOSITE

(75) Inventors: De-Sheng Tsai, Hendersville, TN (US); Thomas Edward Benim, Goodlettsville, TN (US); Marcio B. Amorosino, Sao Paulo-SP (BR)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 11/501,655

(22) Filed: Aug. 9, 2006

(65) Prior Publication Data

US 2008/0038978 A1 Feb. 14, 2008

(51) Int. Cl.
*D04H 1/00* (2006.01)
*D04H 13/00* (2006.01)
*D04H 3/00* (2006.01)

(52) U.S. Cl. .................. 442/328; 442/329; 442/383; 442/384; 442/402; 442/408; 442/104; 442/105; 442/396

(58) Field of Classification Search .................. 442/328, 442/329, 383, 384, 402, 408, 104, 105, 396
See application file for complete search history.

(56) References Cited

U.S. PATENT DOCUMENTS

| | | | |
|---|---|---|---|
| 4,910,075 A | 3/1990 | DuPont | |
| 4,965,122 A | 10/1990 | Morman | |
| 4,981,747 A | 1/1991 | Morman | |
| 5,114,781 A | 5/1992 | Morman | |
| 5,116,662 A | 5/1992 | Morman | |
| 5,226,992 A | 7/1993 | Morman | |
| 5,240,764 A * | 8/1993 | Haid et al. | 442/408 |
| 5,244,482 A | 9/1993 | Hassenboehler, Jr. et al. | |
| 5,492,753 A | 2/1996 | Levy et al. | |
| 5,883,028 A | 3/1999 | Morman et al. | |
| 5,910,224 A | 6/1999 | Morman | |
| 6,465,073 B1 | 10/2002 | Morman et al. | |
| 6,537,930 B1 * | 3/2003 | Middlesworth et al. | 442/39 |
| 6,750,161 B2 * | 6/2004 | Putnam et al. | 442/105 |
| 6,914,018 B1 | 7/2005 | Uitenbroek et al. | |
| 2004/0112524 A1 * | 6/2004 | Erdos et al. | 156/290 |

FOREIGN PATENT DOCUMENTS

| | | |
|---|---|---|
| EP | 0365 293 | 4/1990 |
| EP | 1338 692 A1 | 8/2003 |
| EP | 1 538 250 A1 | 6/2005 |

* cited by examiner

*Primary Examiner*—Norca L Torres-Velazquez

(57) ABSTRACT

An elastic composite having a high tearing strength made of an elastomeric material and a consolidated entangled web, wherein the consolidated entangled fabric has at least 2 lbs of tearing strength in the machine direction and the composite has 70-95% elastic recovery from a 100% elongation in the cross direction and greater than 50% elastic recovery from a 150% elongation in the cross direction.

12 Claims, 1 Drawing Sheet

ELASTIC NONWOVEN COMPOSITE

BACKGROUND OF THE INVENTION

1. Field of the Invention

This invention relates to an elastic composite with a substrate of consolidated entangled web.

2. Description of the Related Art

A conventional elastic nonwoven composite can be made by combining an elastomeric sheet with a necked nonwoven fabric, as described in U.S. Pat. No. 4,981,747, U.S. Pat. No. 5,114,781, U.S. Pat. No. 5,116,662, U.S. Pat. No. 5,226,992, U.S. Pat. No. 5,883,028, U.S. Pat. No. 5,910,224, U.S. Pat. No. 6,465,073, and U.S. Pat. No. 6,914,018. However, such an elastic composite using a necked carded, spunbond, or meltblown web as a substrate and wherein the tensile strength and tearing strength of such a web is dependent on its thermal bonding is typically unsuitable for many commercial applications due to inferior tearing strength in the machine direction.

U.S. Pat. No. 4,965,122 discloses a sequential thermomechanical method of necking the width of a thermally bonded nonwoven web by slowly stretching the web at ambient temperature before subjecting it to a heat setting process. The fiber binding and tensile strength of the resultant web is significantly reduced by this room temperature stretching and some webs can even be broken at draw rates as low as 10%. U.S. Pat. No. 5,492,753 describes an opposite sequential method for treating easy-to-break webs of meltblown fibers by slowly heating the precursor before transferring to a stretching step at ambient temperature. U.S. Pat. No. 5,244,482 and EP 1538250 A1 have shown that thermally bonded nonwoven fabrics can be necked-down to a certain width by simultaneously applying heat and stretch. While applying a uniaxial draw to a web and heating the web at an elevated temperature that is between the softening point of thermoplastic fibers and melting point, the majority of the fibers aligns in the direction of the draw and thereby become a necked fabric with a resultant width reduction.

The consolidation methods described in the prior art actually require precursor webs to contain non-elastomeric thermoplastic fibers and to have been subjected to thermal-mechanical bonding or calendering. The precursor of such a necked nonwoven web can be selected from a carded, spunbond, or meltblown web wherein the tensile strength and tearing strength of such a web is dependent on its thermal bonding. Because only a minority of fibers remain that are oriented crosswise to the direction of drawing after the consolidation process, there is a significant loss in tearing strength in the resultant necked fabric in the draw direction.

An entangled fabric with high tearing strength would be desirable. However, conventional spunlaced and needle-punched fabrics do not lend themselves to the heat-stretch elastication process as described in the prior art because the "bond points" are formed by entanglement, which provides only frictional and interlocking contact points that are not permanently altered by such a process.

SUMMARY OF THE INVENTION

The invention is directed to an elastic composite prepared by applying elastomeric material on a consolidated entangled fabric having at least 2 lbs of tearing strength in the machine direction and wherein the elastic composite has an elastic recovery in the cross direction of 50-95% from 100% elongation and greater than 50% from 150-300% elongation.

BRIEF DESCRIPTION OF THE DRAWING

The FIGURE is a schematic illustration of an apparatus for performing one embodiment of the method of the invention.

DETAILED DESCRIPTION OF THE INVENTION

Figure 1:
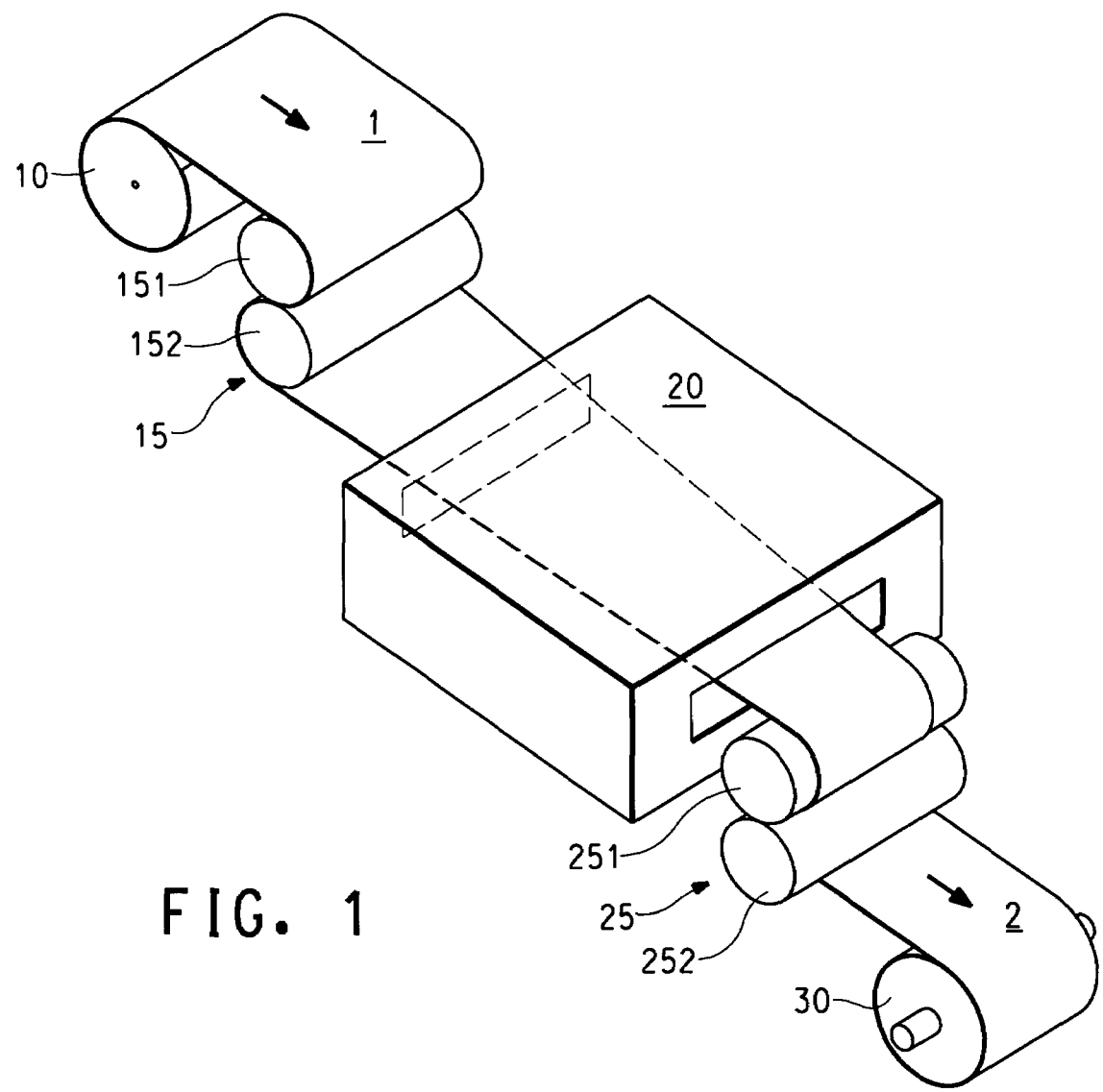

The present invention provides an elastic composite having a high tearing strength by applying an elastomeric material on a consolidated entangled web.

The use of an entangled web precursor provides a thicker, softer, stretchable fabric with a more desirable high tearing strength in its machine direction. The term "machine direction" (MD) is used herein to refer to the direction in which a nonwoven web is produced (e.g. the direction of travel of the supporting surface upon which the fibers are laid down during formation of the nonwoven web). The term "cross direction" (XD) refers to the direction generally perpendicular to the machine direction in the plane of the web.

The precursor web is made of predominantly matrix fibers, such as natural fibers or (poly) ethyleneterephthalate (i.e., polyester), synthetic staple fibers, or a mixture thereof. Binder fibers are blended with the matrix fibers in the precursor web formation process at a level of 5-50% based on the total weight of the fabric. The binder fibers are preferably thermoplastic fibers with a melting point lower than that of the matrix fibers. The binder fibers can be polypropylene, polyethylene, co-polyester, acrylic or polyamide or a bi-component fiber, such as sheath/core, side-by-side, etc. For example, the binder fibers can be bi-component staple fibers having a co-polyester sheath and polyester core or polyethylene sheath and polyester core. The co-polyester composition can vary depending on the manufacturer of the fiber and the desired attributes, but is commonly composed of the copolymer of poly(ethylene terephthalate) and poly(ethylene isophthalate). By incorporating binder fibers into the web that is further processed into the entangled web and then activating these binder fibers in an in-line dryer or in a consolidating process, a high tearing strength consolidated and stretchable web is provided. The cross over points of the binder fibers with themselves and/or the matrix fibers act similarly to the point bonds of a thermally bonded fabric to enhance the strength and the elasticity, compared to the non-blended substrate. The present invention provides high tearing strength elastic composite by applying an elastomeric material on the stretchable consolidated entangled web. The elastomeric material can be polyvinyl chloride (PVC), polyurethane (PU), co-polyesters, ethylene vinyl acetate (EVA), styrene-ethylene/butylene-styrene (SEBS), styrene/ethylene-propylene (SEP), styrene-butadiene-styrene (SBS), or elastomers.

A precursor entangled web of synthetic fibers with or without wood pulp fibers is processed into a web by opening, carding, or other suitable web forming processes followed by entangling either by needle-punching or hydroentangling (also referred to as spunlacing). The entangled web is subjected to an elevated temperature sufficient to soften or at least partially melt the binder fibers, but not the matrix fibers. This can be accomplished by a hot air treatment or any other suitable means for achieving the desired elevated temperature. While subject to the elevated temperature, the entangled web is subjected to a drawing treatment in the machine direction at a drawing ratio sufficient to reduce the web width by more than 30% (preferably in the range of 55-75%) with a strain rate of from 50 to 2500%/min. The drawing ratio can be 5 to 60%, preferably 10 to 20%. The desired elevated temperature (i.e., the softening temperature) is that at which the binder fibers lose their room temperature modulus and become soft, viscous, and transformable. However, depending on the composition of the matrix fibers, the process and fabric temperatures can actually be higher than the melting point of the binder fiber. This step of drawing at an elevated temperature can be accomplished either in-line with the precursor web forming process or as a separate off-line process. The method of heating the precursor web is not particularly limited as long as the heat transfer may be accomplished in as short a time as necessary to avoid damage to the web. Heating may be accomplished by radiation or convection. Radiation heating may be carried out by using infrared methods. Convection heating may be carried out by a suitable heating fluid, preferably a gas, such as air. Other means of heating are acceptable if they provide the correct combination of time and temperature.

The process of the invention can be further described with reference to the FIGURE. Accordingly, an elastic spunlaced fabric 2 is prepared by providing a spunlaced precursor web 1 containing thermoplastic binder fiber, whereby the precursor web is supported by unwinding roll 10. Unwinding roll 10 is rotated around its longitudinal axis whereby the precursor web 1 leaves unwinding roll 10 at a speed A in the machine direction (MD) as indicated by the arrow. The precursor web travels via S-wrap 15 into a heating means 20, through the heating means and from the exit of the heating means via S-wrap 25 to the winding roll 30. S-wrap 25 and winding roll 30 are driven at a speed higher than the unwinding speed A of unwinding roll 10 and S-wrap 15 by a factor of (1+X %). S-wrap 15 comprises rolls 151 and 152. S-wrap 25 comprises rolls 251 and 252. The factor (1+X %) determines the drawing ratio of the precursor web in the process of the present invention. According to the invention, the precursor web is subjected to a drawing treatment in a machine direction at a drawing ratio sufficient to reduce the width by at least 40% and a strain rate within a range of 50 to 2500%/min, at a temperature above the softening point of the binder fibers in order to create in the resultant fabric having a maximum elongation in the cross direction of greater than about 100% up to 500% and a tearing strength greater than 2 lbs, in the MD to provide an elastic composite having elastic recovery of 70-95% with 100% extension.

The strain rate (%/t) is generally determined wherein a sample is drawn and extended a certain (X) percentage in a period of time. The extension percentage can be achieved by the speed ratio of winder or S-wrap (15) to unwinder or S-wrap (25), and the time period of the sample run through can be calculated by dividing D over the average of unwind speed (A) and winder speed of [(1+X %) A]. Speed A is generally expressed in m/min as follows:

$$X\%/\{D/[A+(1+X\%)A]/2\} = X\%/\{2D/[A+(1+X\%)A]\} = \{X\% \times [A+(1+X\%)A]\}/2D$$

Tearing strength is determined in accordance with ASTM 5733. % Elastic Recovery is determined using a strip sample as follows:

(stretched length−recovered length)/(stretched length−original length).

Preferably, the machinery for carrying out the process of the invention is constructed for commercial capacity with an unwinder roll and a winding roll(s) installed in a distance of from 3 to 40 m, preferably about 15-30 m, and a heating device installed in between. The unwinder advantageously runs at commercial speed of more than 30 m/min and up to 300 m/min, preferably at least 100 m/min and up to 250 m/min, and a draw ratio of 5% to 40%, preferably 10-20%, is created by increasing the speed of the winding roll. The strain rate is adjusted to 50 to 2500%/min, preferably 150 to 800%/min. The draw ratio relates to the degree of width reduction of the precursor web and the strain rate relates to the speed of the treatment at a fixed draw ratio.

It was found that when the speed is below the desired range, the web tends to overheat and to become too stiff. On the other hand, if the speed is above the desired range, the precursor web is not sufficiently heated and the web may break during the drawing treatment or the width reduction is not maintained after the web is released from the draw tension. The S-wraps 15 and 25 also control the movement of the nonwoven web, as well as serving as the drawing means.

The consolidated entangled web is characterized by a width reduction of 30-75% compared to the precursor web, a cross-direction extensibility of above 100% to 500%, and a tearing strength of above 2 lbs in machine direction. The draw ratio required to achieve a specific width reduction is very much dependent on the precursor web structure. Obtaining a width reduction greater than 30% is found sufficient for achieving cross-direction elongation greater than 100% in the resultant fabric. The resultant elastic entangled fabric has a thickness of 0.2 mm-3.5 mm and a basis weight of 40 to 300 g/m².

In one embodiment, the elastomeric material is applied by cast coating polyvinyl chloride (PVC) directly onto the consolidated entangled web. In another embodiment, the elastomeric material is applied by transfer laminating polyurethane (PU) or PVC onto the consolidated entangled web. In another embodiment, the elastomeric material is applied by printing Kraton or Neoprene.

In yet another embodiment, the elastomeric material is applied by laminating a thermoplastic polyurethane or PVC film onto the consolidated entangled web.

Products containing the elastic composite of the present invention greatly expand the scope of nonwoven webs available for producing elastic articles in a very cost effective manner. The subject invention has applications in fields such as diapers; elastic bandages; elastic tapes and wraps; and synthetic leathers.

What is claimed is:

1. An elastic composite consisting of at least an elastomeric sheet selected from the group consisting of polyvinyl chloride, polyurethane, co-polyesters, ethylene vinyl acetate, styrene-ethylene/butylene-styrene, styrene/ethylene-propylene, and styrene-butadiene-styrene and at least one entangled web comprising binder fibers and matrix fibers, wherein the binder fibers have a melting point lower than that of the matrix fibers and wherein the entangled web is pre-consolidated at an elevated temperature to have a maximum elongation greater than 100% in the cross direction and a tearing strength greater than 2 lbs in the machine direction and the elastic composite has an elastic recovery in the cross direction of 50-95% from 100% elongation and greater than 50% from 150-300% elongation.

2. The composite of claim 1, wherein the entangled web has a maximum elongation of 100-500% in the cross direction.

3. The composite of claim 1, wherein the entangled web is a mesh or continuous surface sheet.

4. The composite of claim 1, wherein the entangled web is selected from the group consisting of an air-jet entangled web, a needle-punched web of fibers, a web of spunlaced fibers, and a multilayer material including at least one of the webs.

5. The composite of claim 1, wherein the entangled web comprises fibers selected from the group consisting of polyethylene, polypropylene, polyester, polyamide, a mix of above fibers, and a combination of the above synthetic fibers with cotton, rayon, or other natural fibers.

6. The composite of claim 1, wherein the elastomeric material is applied in the form of one selected from the group consisting of film, net, liquid, or powder.

7. The composite of claim 1, wherein the method of applying the elastomeric material to at least one side of the entangled web is selected from the group consisting of coating, spraying, and printing.

8. The composite of claim 1, wherein the method of combining the elastomeric material to the entangled web is selected from the group consisting of full sheet bonding and point bonding lamination with heat or adhesives.

9. The composite of claim 7, wherein a middle layer of elastomeric material is sandwiched between two sheets of entangled web.

10. An elastic bandage comprising the composite of claim 1.

11. An elastic tape comprising the composite of claim 1.

12. An elastic synthetic leather comprising the composite of claim 1.

* * * * *